3,405,113
POLYMERIZATION CATALYST
Gifford G. McClaflin, Ponca City, Okla., assignor to Continental Oil Company, Ponca City, Okla., a corporation of Delaware
No Drawing. Filed Nov. 20, 1964, Ser. No. 412,852
6 Claims. (Cl. 260—93.5)

ABSTRACT OF THE DISCLOSURE

It is disclosed that ethylenically unsaturated monomer can be polymerized to produce stereo regulated polymers by carrying out the polymerization in the presence of a catalyst comprising an aluminum hydrocarbon, titanium trichloride, and, as a promoter, acitic acid or its anhydride.

---

This invention relates to a process for polymerizing certain olefinic materials, and to certain new catalyst compositions employed in such polymerization process. In one of its aspects, this invention relates to the polymerization of ethylenically unsaturated monomers to produce stereo regulated polymers, that is, polymers having a high isotactic content.

Polymerization processes by which ethylenically unsaturated monomers, such as styrene and 1-olefins including propene, butene, pentene and hexene, are polymerized to form the corresponding polymer thereof, are now well known and widely used. In the polymerization of such ethylenically unsaturated monomers, coordination-type catalysts of the general type commonly referred to as Ziegler-Natta catalysts, are widely used.

In its most basic form, the Ziegler-Natta catalyst system includes an organo-metallic compound (the metal being selected from Groups I to II of the periodic table and preferably being aluminum) and a transition metal halide (frequently one of the titanium halides). Many modifications and improvements have been made with respect to the basic constitution of the Ziegler-Natta catalyst systems, and many of these improved catalyst compositions have been effective in the attainment of the specific ends for which they are developed. Such catalyst systems are disclosed in many U.S. and foreign patents and the literature. U.S. Patent 2,985,640 discloses a wide variety of such catalyst systems.

In the case of the polymeriaztion of some ethylenically unsaturated monomers such as 1-olefins of 2 to 6 carbon atoms, styrene, methyl-styrene and substituted derivatives of such monomers and chlorinated monomers, the presently existing commercial usage of the polymer in many instances requires that the polymer be characterized by a high degree of crystallinity or isotaxy. This latter property (that is the isotactic property) of the polymer results from the stereo regularity of the repeating units of the polymer chain and is manifested by a more highly crystalline or less amorphous character in the polymer. When the basic, two-component Ziegler-Natta catalyst is utilized for polymerizing such monomers, the degree of isotaxy which characterizes the polymer product as measured by the accepted criterion of solubility in boiling heptane, is of a somewhat low degree. For example, the isotaxy of polypropylene prepared with such a system rarely exceeds about 65 percent. This low degree of isotaxy renders the polymer so produced unsuited for many present commercial requirements, thus the production of such polymer employing the basic two-component catalyst system has been limited. Other attempts to improve the isotactic property of the polymer by incorporating various modifiers in the basic Ziegler-Natta catalyst system have resulted in some improvement in isotactic content of the polymer produced, but have frequently resulted in a reduction in the rate of polymerization or the yield which is so severe as to render the employment of such catalyst system of questionable economic feasibility.

It is an object of this invention to provide an improved polymerization catalyst system which is capable of forming polymers having a very high isotactic content.

It is another object of this invention to provide a novel catalyst.

It is still another object of this invention to provide a method of polymerizing certain ethylenically unsaturated monomers to produce polymers of high isotactic content.

Still other objects and advantages of the invention will be obvious from this specification and the claims.

These and other objects of the invention are accomplished by polymerizing ethylenically unsaturated monomers of at least 3 carbon atoms in the presence of an aluminum hydrocarbon, titanium trichloride and a compound selected from the group consisting of acetic acid and acetic anhydride.

As has been indicated, the catalyst addition material useful in this invention is acetic acid or acetic anhydride. The prior art has shown a wide variety of metal alkyl—transition metal halides or basic Ziezler-Natta catalyst. However, the acetic acid or its anhydride is believed to be specific to a limited combination in producing polymers of high isotactic content.

Although the art recognizes many transition metal halides as suitable in polymerization catalyst systems of the Ziegler-Natta type, the metal halide useful in this invention is titanium trichloride.

The art also teaches that organo-metal compounds of Groups I–A, II–A and III–B are useful as the second component of the Ziegler-Natta system, the organo-metal compound useful in this invention is an organo-aluminum compound.

The organo-aluminum compounds which are useful in the invention are represented by the formula $AlR_nX_{3-n}$ where R is a hydrocarbon radical, X is hydrogen and $n$ varies from 2 to 3. Of these materials, those in which the hydrocarbon substituents of the aluminum are alkyl groups are preferred. These preferred compounds within the scope of the structural formula above include, but are limited to, triethylaluminum, tripropylaluminum, triisobutylaluminum, triamylaluminum, trihexylaluminum, diethylaluminum hydride, dipropylaluminum hydride and the like.

In addition to the various preferred types of alkyl substituted aluminum compounds mentioned, it will be apparent that the formula set forth above can include other hydrocarbon groups. The hydrocarbon radicals in the aluminum compounds can be either like or unlike, and can include the aromatic and saturated aliphatic radicals as, for example, alkyl, aryl, cycloalkyl, alkryl and aralkyl. The hydrocarbons, whether alkyl or other types, are preferably limited to those containing from 1 to about 12 carbon atoms, and are most preferably the lower alkyl groups containing from about 2 to about 6 carbon atoms, and in any case the number of carbon atoms in any straight chain should not exceed about 6 carbon atoms.

The catalyst of this invention consists essentially of the three aforementioned components and can be prepared by any suitable means as have been disclosed for the two-component basic Ziegler-Natta catalyst system. The catalyst is most conveniently prepared in an inert diluent, e.g. a diluent which is inert in the polymerization reaction. It is known, for example, that these monomers subject to polymerization and capable of forming crystalline polymers are conveniently polymerized in the presence of a diluent.

The molar ratio of aluminum compound to titanium compound can be of any desired ratio known to the art.

In general this mole ratio will be from 0.15:1 to 10:1 and preferably 0.5:1 to 10:1 and most frequently from 1:1 to 5:1.

In like manner, the acetic compound can be related to the aluminum compound. That is the molar ratio of aluminum compound to the acetic compound can vary over a wide range, but in general will be at least 1:1 and generally will range from 1:1 to 5:1, preferably 3:1 to 5:1. The catalyst can be added to diluent prior to introduction of monomers or the diluent and monomer can be mixed prior to adding the catalyst.

Examples of suitable catalyst systems include but are limited thereto the following: triisobutylaluminum, titanium trichloride, acetic acid; trioctylaluminum, titanium trichloride, acetic anhydride; tributylaluminum, titanium trichloride, acetic acid; triethylaluminum, titanium trichloride, acetic acid; diethylpropylaluminum, titanium trichloride, acetic anhydride; tribenzylaluminum, titanium trichloride, acetic anhydride; dipropylbenzylaluminum, titanium trichloride, acetic anhydride; triisopropylaluminum, titanium trichloride, acetic acid; tridodecylaluminum, titanium trichloride, acetic acid; diethylaluminum hydride, titanium trichloride, acetic anhydride; diisobutylaluminum hydride; titanium trichloride, acetic acid; dioctylaluminum hydride, titanium trichloride, acetic acid; didodecylaluminum hydride, titanium trichloride, acetic acid; diethyl-ethylbenzylaluminum, titanium trichloride, acetic acid; diethylaluminum.

The monomers which are polymerized through the use of the catalyst of this invention are defined broadly as polymerizable, ethylenically unsaturated hydrocarbon monomers, or differently described, as vinyl hydrocarbons. A preferred class of these compounds is the aliphatic 1-olefins of 3 to about 6 carbon atoms, for example, propylene, 1-butene, 1-pentene-2-methyl, 1-hexene and the like. The polymerizable, ethylenically unsaturated monomers which can be advantageously polymerized with the catalyst of this invention also include the aryl olefins such as styrene and substituted styrene. The alkyl substituted styrene can include up to 10 or more carbon atoms, however, preferably the alkyl groups will generally contain not more than about 4 carbon atoms, for example, methyl styrene, ethyl styrene, ethylmethyl styrene and the like. It is also within the scope of the invention to polymerize mixtures of the monomers to obtain copolymers if desired.

The invention is particularly applicable to the polymerization of those monomers which are capable of yielding polymers having an isotactic molecular structure in which the repeating side groups along the carbon chain are of a regular arrangement. This geometry imparts to the isotactic polymer a high degree of crystallinity. Monomers which may be polymerized in the presence of the catalyst of this invention to produce improved yields of isotactic polymers are preferably, but not limited to, propylene, butylene and styrene.

The catalyst systems of the invention are preferably prepared as dispersions in the reaction medium solvent or diluent, and the polymerization reaction is subsequently carried out in the presence of this solvent. The organic diluent or reaction medium used is preferably in aliphatic or aromatic hydrocarbon such as pentane, hexane, heptane, isooctane, cyclohexane, methylcyclopentane, benzene, toluene, kerosene, wash oil and the like. In general, aliphatic hydrocarbons containing from 7 to 9 carbon atoms are preferred to those containing fewer carbon atoms. The catalyst is preferably prepared in an oxygen and moisture-free atmosphere, e.g. in a vessel which has been flushed with an inert gas such as nitrogen or argon.

The amount of catalyst employed can vary over a wide range. It is known, for example, that catalytic amounts can be extremely small, and in general excess amounts are not harmful. Most generally, a sufficient amount of catalyst will be employed to provide an amount of alkyl-aluminum in the range 0.1 to 10 weight percent based on the weight of the total reactants present in the polymerization zone.

As has been indicated, the catalyst is useful in the well known polymerization of ethylenically unsaturated monomers with the basic two-component system. As is known, the pressure at which the polymerization is carried out is dependent upon the monomer which is to be polymerized and other variables. In general the reaction pressure is sufficiently high to maintain the inert diluent which is employed in a liquid state under the prevailing reaction conditions. In most instances, the polymerization reaction is suitably carried out at atmospheric pressure or higher. However, the pressure can vary widely from slightly below atmospheric up to several thousand pounds per square inch, e.g. 3,000 p.s.i.g. While high pressures are not required in order to promote the polymerization, they frequently will have a desirable effect on the reaction rate, and, in some instances, on the polymer quality. The choice of whether or not to use an appreciably elevated pressure will be based upon economic and practical considerations, taking into account the advantages that can be obtained thereby. In general, however, the pressure employed will range between atmospheric and 200 p.s.i.g.

In the course of the polymerization reaction, the catalyst and monomer are preferably intimately contacted by agitating the system by stirring or other suitable means. However, in many instances, the polymerization mixture can be allowed to remain quiescent while polymerization takes place. The polymerization can be effected by a batch method, or by a continuous process, such as by passing the reaction mixture through an elongated reaction tube which is contacted externally with suitable cooling media to maintain a desired reaction temperature.

The polymerization processes employing the catalyst system of the invention can be carried out over a wide range of temperatures with the particular preferred temperature again being chosen in accordance with the particular monomer to be polymerized, the pressure employed and other reaction variables. In general, the polymerization reaction is carried out at as low a temperature as is feasible, usually between 0° C. and 150° C. In most instances, the temperature utilized is in the range 25° C. to about 100° C. Increasing the temperature increases the reaction rate, and thus the temperature is somewhat dependent upon the chosen pressure and vice versa.

The time required to carry out the polymerization reaction is dependent upon most of the variables which have already been described as affecting the temperature and pressure which are to be employed. Broadly, the reaction time can be varied from about as low as a few minutes, for example, two minutes, to as high as 100 hours. Generally, however, in a batch process, the reaction is carried out over a period of from about 4 to about 24 hours.

The polymer products produced by the use of the catalyst of the invention can be recovered from the total reaction mixture by a wide variety of procedures, most of which are conventional and well understood by those skilled in the art, and which are chosen in accordance with the properties of the particular polymer produced, the presence or absence of solvent at the end of the polymerization run and the like. It is generally desirable to remove as much of the catalyst as possible, and this is conveniently done by contacting the total reaction mixture, or the polymer after separation from the solvent, etc., with methanolic hydrochloric acid, with an aliphatic alcohol such as methanol, isobutanol, secondary butanol, or by other known procedures. If the polymer is insoluble in the diluent, it can be separated therefrom by filtration, centrifuging or other suitable physical techniques. If the polymer is soluble in the solvent, it is advantageously precipitated by admixture of the solution with a nonsolvent, such nonsolvent usually being an organic liquid miscible with the solvent, but in which the polymer to be recovered is not readily soluble. Of course, any solvent present can also be separated from the polymer by evaporation, however, care should be taken to avoid subjecting the polymer to too high a temperature in such operation.

For the purpose of illustrating the invention, the following examples are given.

The terms used in the examples and the data presented in the table will be better understood from the definitions and formulae as follows:

(1) Insoluble polymer: the solid polymer isolated as an initial precipitate in the polymer work up procedure.

(2) Soluble polymer: material isolated from the filtrate from, and subsequent washing of, insoluble polymer. This is part of the atactic fraction.

(3) Total polymer: the sum of insoluble and soluble polymer as defined in 1 and 2.

(4) Percent conversion of monomer: monomer charged minus the monomer reacted at the end of polymerization multiplied by 100 and divided by the monomer charged.

(5) Isotactic index: the percent of insoluble polymer not extracted by refluxing normal-heptane.

(6) Total yield of isotactic polymer: the grams of insoluble polymer multiplied by the isotactic index divided by the grams of monomer converted.

In the examples the $TiCl_3$ had been aluminum reduced or activated as is a well known procedure in the art, it is not intended that this be a limiting requirement. Such activation does, however, promote initiation of the reaction but is not required.

Example I

To a dry argon flushed 220 ml. beverage bottle was added 100 ml. of dry n-heptane, 4.7 mm. of $AlEt_3$ (aluminum triethyl), 2.8 mm. of glacial acetic acid and 2.3 mm. of $TiCl_3AA$ (aluminum activated, e.g. 1 mol $AlCl_3$ plus 3 mols $TiCl_3$). The charge, except the n-heptane, was added to the bottle in a dry box. The bottle was covered with a rubber septum and capped with a three-hole metal cap. Propylene (40 p.s.i.g. or 7.6 g.) was added and the bottle placed in a bottle polymerizer and rotated at 75° C. for four hours. A hypodermic needle was forced through the rubber septum and 0.2 g. of gas was vented off. Isopropanol, 50 ml., was added to the bottle to kill the catalyst. The bottle was uncapped and contents dumped into a blender. 100 ml. of n-heptane was used to rinse the bottle. The n-heptane washings were added to the blender. 200 ml. of distilled water was then added to the blender. The contents were blended for 3–4 minutes at a high speed. The blended mixture was transferred to a one-liter separatory funnel which contained 30 ml. of concentrated hydrochloric acid. The mixture was vigorously shaken. After standing a few minutes, layers appeared. The lower layer was drawn off and discarded. The polymer was washed (2×500 ml.) with distilled water. The water layer was drawn off and discarded. The polymer and organic solvent portion was added to 200 ml. of isopropanol. This mixture was shaken and then filtered. The filtrate was evaporated to dryness and weighed. It was recorded at 0.5 g., however, this appears to have been in error since 7.6 g. of propylene charged, 0.2 g. was vented and 7.4 g. of solid polymer recovered. The filter cake was placed in the blender and blended with 300 ml. of isopropanol for 3 to 4 minutes. It was then filtered and the filtrate discarded. The filter cake was dried in a nitrogen flushed vacuum oven for 18 hours at 65° C. The filter cake after allowing to cool weighed 7.4 grams. A portion of this polymer was extracted with refluxing n-heptane for 6 hours and after drying and cooling the extraction thimble, there was present 88% of the sample, e.g. yield of heptane insoluble equals 88% based on the propylene converted.

Examples II and III

Two additional runs were carried out as in Example I. The data are shown in the table.

Examples IV, V, VI and VII

Four additional runs were made according to the procedure of Example I except acetic anhydride was used in place of acetic acid. The data are given in the table:

TABLE

| Run | $AlEt_3$, mm. | Acetic material, mm. | $TiCl_3$, mm. | $C_3$, grams | Solid polymer, grams | Oily polymer, grams | Isotactic index | Percent yield insol. |
|---|---|---|---|---|---|---|---|---|
| 2 | 4.7 | 2.8 | 2.3 | 7.6 | 7.3 | 0.2 | 88.9 | 87.6 |
| 3 | 6 | 4.2 | 3.0 | 6.7 | 5.9 | 0 | 96 | 96 |
| 4 | 13.6 | 5.4 | 6.8 | 7.2 | 7.1 | 0.3 | 86.3 | 85.1 |
| 5 | 13.6 | 5.4 | 6.8 | 7.2 | 7.1 | 0.3 | 87.8 | 86.6 |
| 6 | 15.0 | 7.5 | 7.5 | 7.3 | 6.7 | 0.2 | 93.7 | 86.1 |
| 7 | 14.8 | 7.4 | 7.4 | 7.2 | 6.9 | 0.4 | 93.3 | 89.5 |

Having thus described the invention, I claim:

1. A process for polymerizing ethylenically unsaturated hydrocarbon selected from the group consisting of 1-olefins of 3 to 6 carbon atoms and vinyl aromatics which comprises contacting such hydrocarbons under polymerization conditions with a catalyst comprising an aluminum alkyl, titanium trichloride and an acidic compound selected from the group consisting of acetic acid and acetic anhydride.

2. The process of claim 1 wherein the mole ratio of aluminum to titanium is in the range 0.15:1 to 10:1 and the mole ratio of aluminum to the acidic compound is in the range 1:1 to 5:1.

3. The process of claim 2 wherein the acidic compound is acetic anhydride.

4. The process of claim 3 wherein the ethylenically unsaturated hydrocarbon is propylene.

5. The process of claim 3 wherein the ethylenically unsaturated hydrocarbon is butylene.

6. The process of claim 3 wherein the ethylenically unsaturated hydrocarbon is styrene.

References Cited

UNITED STATES PATENTS

| | | | |
|---|---|---|---|
| 2,965,627 | 12/1960 | Field et al. | 260—93.7 |
| 3,082,198 | 3/1963 | Klein | 260—94.9 |
| 3,135,702 | 6/1964 | De Vries et al. | 260—94.9 |

JOSEPH L. SCHOFER, *Primary Examiner.*

L. EDELMAN, *Assistant Examiner.*